United States Patent [19]

Kobayashi

[11] Patent Number: 4,739,303

[45] Date of Patent: Apr. 19, 1988

[54] MAN-MACHINE LINK FOR CONVERTING COORDINATES TO PHASE DIFFERENCES REPRESENTATIVE OF INCREMENTS IN THE COORDINATES

[75] Inventor: Tadashi Kobayashi, Tokyo, Japan

[73] Assignee: NEC Corporation, Japan

[21] Appl. No.: 757,642

[22] Filed: Jul. 22, 1985

[30] Foreign Application Priority Data

Jul. 27, 1984 [JP] Japan .............................. 59-156820

[51] Int. Cl.$^4$ ............................................. G09G 3/00
[52] U.S. Cl. ................................... 340/346; 340/706; 178/18
[58] Field of Search ............... 340/706, 709, 710, 712, 340/346; 178/17 C, 18, 19, 20; 364/556, 571

[56] References Cited

U.S. PATENT DOCUMENTS

| | | | |
|---|---|---|---|
| 3,732,557 | 5/1973 | Evans et al. | 340/710 |
| 3,975,592 | 8/1976 | Carvey | 178/18 |
| 4,492,818 | 1/1985 | Abe | 178/18 |
| 4,501,931 | 2/1985 | Ohya et al. | 178/18 |
| 4,507,523 | 3/1985 | Gohara et al. | 178/19 |

*Primary Examiner*—John W. Caldwell, Sr.
*Assistant Examiner*—Mahmoud Fatahi-Yar
*Attorney, Agent, or Firm*—Laff, Whitesel, Conte & Saret

[57] ABSTRACT

A tablet device provides a coordinate count. A link is provided for each of the coordinates, the link including a pulse signal generator for generating first and second pulse signals which have a variable phase difference and which supply an interface for a "mouse". Controlled by the second pulse signal, an up-down pulse counter counts up and down in response to the first pulse signals. By comparing the pulse count with the coordinate count, a comparator produces a result signal which is indicative of whether the pulse count is or is not less than the coordinate count. The result signal is used in adjusting the variable phase difference to make the pulse count converge on the coordinate count. The pulse signal generator may have a pulse sequence generator for generating first and second pulse sequences which are produced as the respective pulse signals and which are not produced when the result signal indicates that the pulse count is or is not equal to the coordinate count, respectively. Preferably, the link is supplied with either an origin indicating signal which is indicative of an origin or an origin signal which selectively indicates the origin. The variable phase difference is adjusted to make the pulse count converge to zero when the origin is indicated. The link can be implemented by a computer.

9 Claims, 3 Drawing Sheets

MAN-MACHINE LINK FOR CONVERTING COORDINATES TO PHASE DIFFERENCES REPRESENTATIVE OF INCREMENTS IN THE COORDINATES

BACKGROUND OF THE INVENTION

This invention relates to a man-machine link for use in supplying a coordinate representing digital signal from a tablet device to an information handling system which may be a personal computer or a work station. It is to be noted in connection with the expression of a "man-machine" link that this invention relates to a link for use in combination with the tablet device.

The tablet device is described, for example, in a report contributed by M. R. Davis et al of the Rand Corporation, California, to Proceedings of the 1964 Fall Joint Computer Conference, pages 325-331, under the title of "The Rand Tablet: a Man-Machine Graphical Communication Device," and in another report which was contributed by James F. Teixeira et al of Sylvania Electronic Systems, Massachusetts, to 1968 Spring Joint Computer Conference, pages 315-321, and is given a title of "The Sylvania data tablet: A new approach to graphic data input." In the manner which will later be described a little more in detail, such a tablet device comprises a tablet and a stylus. When the stylus is brought into contact with the tablet at a point, the device produces a digital signal representative of the abscissa and the ordinate of the point as a coordinate count.

On supplying the digital signal to the above-exemplified information handling system, the tablet device is connected to a port of an interface for the system. When the port is exclusively used in other data communication, a new interface is necessary for the digital signal of the tablet device.

A "mouse" is a tablet device of a sort which has recently been developed into practical use. Information handling systems have become widely used, which are equipped with particular interface for the mice. Ordinarily, the interface for the mouse is incapable of directly dealing with absolute values of the abscissa and the ordinate. Instead, the interface deals only with a two-phase pulse signal of a phase difference which corresponds to an increment or a decrement, or a positive or a negative increment, in each of the abscissa and the ordinate. The information handling system is therefore inoperative when a conventional tablet device is connected directly to an interface for a mouse. In fact, a conventional tablet device must be used instead of a mouse when it is difficult to supply the information handling system with patterns of certain kinds.

SUMMARY OF THE INVENTION

It is therefore an object of the present invention to provide a man-machine link capable of converting a coordinate count produced by a tablet device to a two-phase pulse signal having a phase difference which corresponds to an increment or a decrement in the coordinate count.

It is another object of this invention to provide a man-machine link of the type described, which is for use between a pen-tablet device of a conventional type and an interface designed for connection to a mouse.

Other objects of this invention will become clear as the description proceeds.

According to this invention, there is provided a man-machine link which is for use in combination with a tablet device for producing a first digital signal representative of a coordinate count of a point on a two-dimensional coordinate system and which comprises: pulse signal generating means for generating a first and a second pulse signal wherein pulses of the first pulse signal has a predetermined repetition period, wherein the second pulse signal has a variable phase difference relative to the first pulse signal, and wherein each pulse of the second pulse signal alternately has a first and a second level; counting means responsive to the second pulse signal for counting the pulses of the first pulse signal to produce a second digital signal representative of a pulse count which increases and decreases when each pulse of the second pulse signal has the first and the second levels, respectively; comparing means responsive to the first and the second digital signals for comparing the pulse count with the coordinate count to produce a result signal indicative of whether the pulse count is not or is less than the coordinate count; and supplying means for supplying the result signal to the pulse signal generating means to make the pulse signal generating means generate the first and the second pulse signals with the variable phase difference adjusted so as to make the pulse count converge to the coordinate count.

DESCRIPTION OF THE PREFERRED EMBODIMENTS

Figure 1:
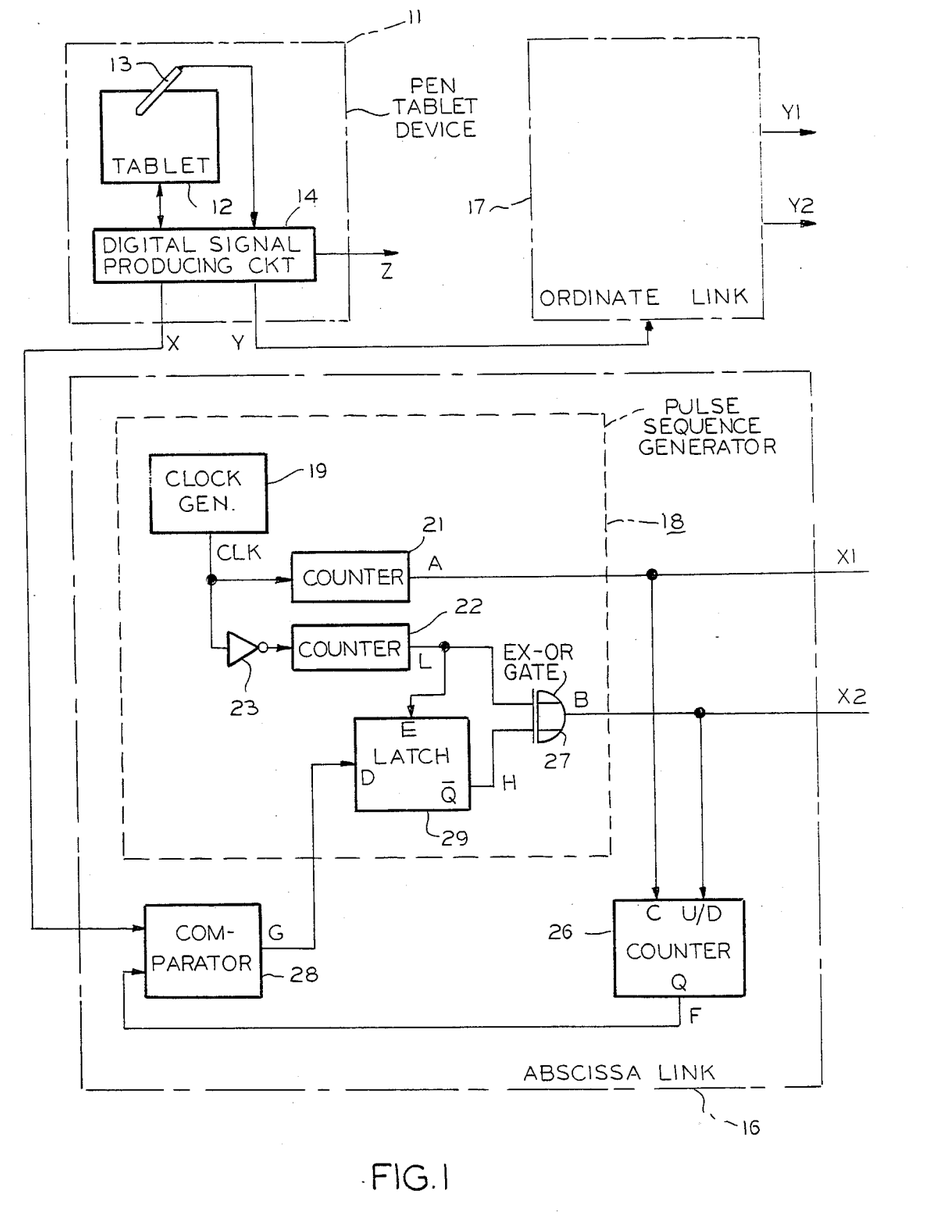
FIG. 1 shows, together with a tablet device, a block diagram of a man-machine link according to a first embodiment of the instant invention.

Referring to FIG. 1, tablet device 11 delivers a first digital signal to a man-machine link according to a first embodiment of the present invention. The tablet device 11 may be of the type of the Rand tablet mentioned heretobefore. The first digital signal represents a coordinate count of a point or dot on a two-dimensional coordinate system, which is typically an orthogonal coordinate system.

In the manner known in the art, the tablet device 11 comprises a tablet 12 which comprises, in turn, a great number of crossing conductors (not shown) to digitally define abscissa and ordinates of the coordinate system with a high resolution. A pen or stylus 13 is manually movable along the tablet 12. The tablet 12 and the pen 13 are electrically connected to a digital signal producing circuit 14.

On using the tablet device 11, the pen 13 is brought into mechanical contact with the tablet 12 at a point. The digital signal producing circuit 14 produces abscissa and ordinate signals X and Y which represent a pair of coordinates, or the abscissa and the ordinate, of the point. Usually, the digital signal producing circuit 14 furthermore produces an additional signal Z which represents whether or not the pen 13 is in touch with the tablet 12 in the manner described in the Teixeira et al report cited hereinabove. When the pen 13 is moved along the tablet 12 to draw a graph or a letter, the abscissa and the ordinate signals X and Y vary in compliance with the graph or letter. Such abscissa and ordinate signals X and Y are herein referred to either individually or collectively as the first digital signal. The abscissa and the ordinate are either individually or collectively called the coordinate count.

The man-machine link comprises abscissa and ordinate links 16 and 17. Responsive to the abscissa signal X, the abscissa link 16 produces an abscissa two-phase pulse signal which consists of first and second abscissa pulse signals or components X1 and X2. Pulses of the first abscissa pulse signal X1 has a predetermined repetition period. The second abscissa pulse signal X2 has a variable phase difference relative to the first abscissa pulse signal X1. Likewise, the ordinate link 17 produces an ordinate two-phase pulse signal consisting of first and second ordinate pulse signals Y1 and Y2. Pulses of the first ordinate pulse signal Y1 may have either the predetermined repetition period or another predetermined repetition period. Relative to the first ordinate pulse signal Y1, the second ordinate pulse signal Y2 has a phase difference which is variable independently of the phase difference of the abscissa two-phase pulse signal. The abscissa and the ordinate two-phase pulse signals X1-X2 and Y1-Y2 are for delivery to an interface for an information handling system (not shown), which may be an interface for a mouse mentioned heretobefore. In the manner which will presently become clear, the variable phase differences of the abscissa and the ordinate two-phase pulse signals X1-X2 and Y1-Y2 correspond to positive and/or negative increments in the abscissa and the ordinate, respectively.

Inasmuch as the links 16 and 17 are similar in structure, only the abscissa link 16 will mainly be described in detail throughout the following with the modifier "abscissa" omitted in general. The link 16 comprises a pulse sequence generator 18 which generates the first and the second pulse signals X1 and X2 in the example being illustrated.

Figure 2:
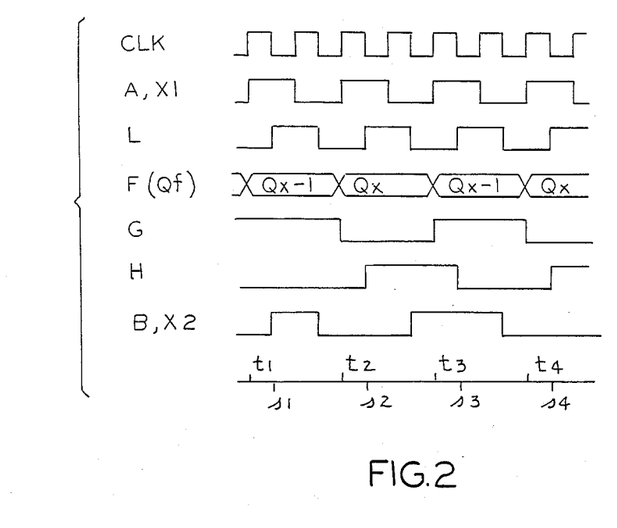
FIG. 2 is a schematic time chart for use in describing operation of the man-machine link illustrated in FIG. 1.

Referring to FIG. 2 in addition to FIG. 1, the pulse sequence generator 18 comprises a clock generator 19 for generating a clock sequence CLK of a predetermined clock period. Supplied with the clock sequence CLK directly from the clock generator 19, a first ring counter 21 produces a first pulse sequence A. The clock sequence CLK is delivered to a second ring counter 22 through an inverter 23. The second ring counter 22 produces a local pulse sequence L which has a predetermined phase difference relative to the first pulse sequence A. When a binary ring counter is used as each of the first and the second ring counters 21 and 22, the first pulse sequence A has a pulse repetition period which is twice the clock period. The local pulse sequence L has a phase difference of ¼ of the pulse repetition period of the first pulse sequence A. In the illustrated example, the clock sequence CLK and the first and the local pulse sequences A and L are rectangular pulse sequences.

The first pulse sequence A is delivered to a count input terminal C of an up-down counter 26. The local pulse sequence L is supplied to an input terminal of an Exclusive OR gate 27 which has another input terminal and delivers a second pulse sequence B as an output pulse sequence to an up-down control terminal U/D of the counter 26. Each pulse of the second pulse sequence B alternately has a first and a second level. For the man-machine link being illustrated, the first and the second levels are a low and a high or a logic zero and a logic one level, respectively. In the manner which will become clear as the description proceeds, the second pulse sequence B has a controllable phase difference relative to the first pulse sequence A. In the example being illustrated, the first and the second pulse sequences A and B are used as the first and the second pulse signals X1 and X2, respectively.

Controlled by the second pulse sequence B, the up-down counter 26 counts the pulses of the first pulse sequence A to produce a second digital signal F from an output terminal Q. The second digital signal F represents a pulse count (an abscissa pulse count) Qf which increases and decreases when the second pulse sequence B has the low and the high levels, respectively, in the manner which will presently be described.

A comparator 28 is for comparing the pulse count Qf of the second digital signal F with the coordinate count of the first digital signal (the abscissa signal) X to produce a result signal G which is a pulse sequence representative of a result of comparison. Being represented by the abscissa signal X, the coordinate count will be represented by Qx. The result signal G has the first or low and the second or high levels when the pulse count Qf is not and is less than the coordinate count Qx, respectively, in the manner which will shortly be exemplified. In other words, the result signal G has the first level when the pulse count Qf is either equal to or greater than the coordinate count Qx.

The result signal G is delivered or fed back by any suitable supplying means to an input terminal D of a latch circuit 29 of the pulse sequence generator 18 through a supplying connection as an input signal of the latch circuit 29. The latch circuit 29 has a control terminal E supplied with the local pulse sequence L. Each time when the local pulse sequence L builds up to the high level, the latch circuit 29 latches the result signal G as a latched signal. The latch circuit 29 has an inverted output terminal $\bar{Q}$ from which the latched signal is delivered with inversion as an inverted signal H to the above-mentioned other input terminal of the Exclusive OR gate 27. Being controlled by the local pulse sequence L, the inverted signal H is in phase synchronism with the local pulse sequence L.

In FIG. 2, first through fourth time instants t1, t2, t3, and t4 are depicted at which the first pulse sequence A builds up to the high level. First through fourth subordinate instants s1, s2, s3, and s4 are time instants at which the local pulse sequence L builds up after the first through the fourth time instants t1 to t4, respectively.

For the first time instant t1, it will be assumed that the inverted signal H has the first or low level and that the pulse count Qf of the second digital signal F is equal to (Qx−1), namely, is less than the coordinate count Qx. The result signal G is given the high level. At the first subordinate instant s1, the latch circuit 29 latches the result signal G of the high level as the latched signal. The inverted signal H is kept at the low level. The Exclusive OR gate 27 produces the local pulse sequence L as the second pulse sequence B without modification during a time interval between the first and the second time instants t1 and t2.

At the second time instant t2, the second pulse sequence B has the first or low level. The pulse count Qf is therefore counted up to Qx. Inasmuch as the pulse count Qf is not less than the coordinate count Qx, the result signal G is given the low level. At the second subordinate instant s2, the latch circuit 29 latches the result signal G. The inverted signal H builds up to the high level. The local pulse sequence L is produced as the second pulse sequence B without inversion until the second subordinate instant s2 and with inversion thereafter.

At the third time instant t3, the second pulse sequence B has the second or high level. The pulse count Qf is counted down to (Qx−1). The result signal G builds up. The latch circuit 29, however, does not yet latch the result signal G before the third subordinate instant s3. When the latch circuit 29 latches the result signal G of the low level at the third subordinate instant s3, the inverted signal H builds down. The local pulse sequence L is produced as the second pulse sequence B with inversion until the third subordinate instant s3 and without inversion thereafter.

At the fourth time instant t4, the second pulse sequence B is low. The pulse count Qf is counted up to Qx. The second pulse sequence B is given the low and the high levels as in a time interval between the second and the third time instants t2 and t3.

It will now be appreciated that the result signal G is supplied to the pulse sequence generator 18 through the supplying connection to make the latch circuit 29 and the Exclusive OR gate 27 cooperate with the local pulse sequence L to adjust the controllable or variable phase difference so as to make the pulse count Qf of the second digital signal F converge to the coordinate count Qx of the first digital (the abscissa) signal X. It will readily be understood that the abscissa and the ordinate links 16 and 17 may comprise the dock generator 19 in common.

In the manner pointed out heretobefore, an interface is specifically designed for a mouse which produces a mouse two-phase signal having a phase difference variable in correspondence to the coordinate count. The interface comprises an interface counter responsive to the mouse two-phase signal for producing an interface digital signal which is counted up and down so as to follow the above-described first digital signal. It is therefore possible with the first and the second abscissa and ordinate pulse signals X1, X2, Y1, and Y2 to make the interface produce the interface digital signal which follows the abscissa and the ordinate signals X and Y.

Figure 3:
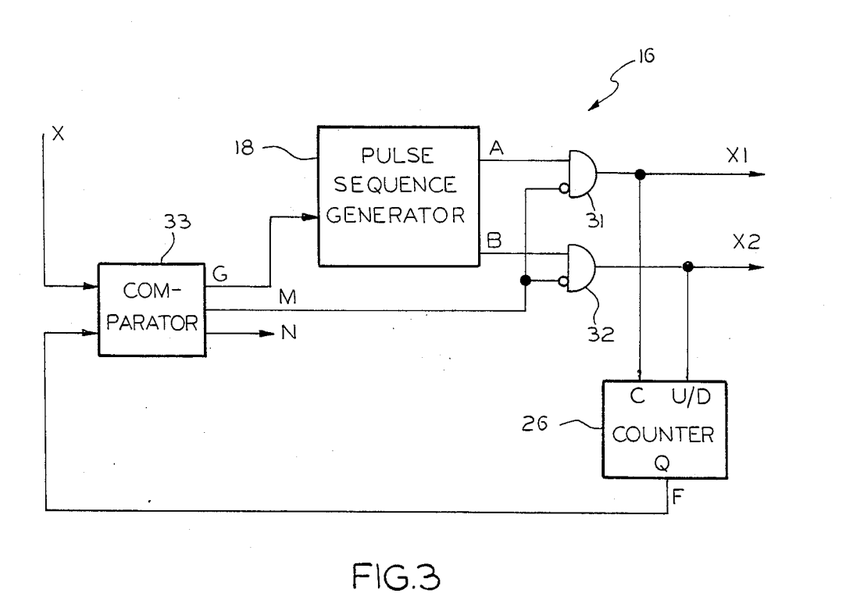
FIG. 3 is a partial block diagram of a man-machine link according to a modification of the link shown in FIG. 1.

Turning to FIG. 3, there is depicted a man-machine link according to a modification of the man-machine link illustrated with reference to FIGS. 1 and 2. In addition to similar parts which are designated by like reference numerals and are operable with similar signals denoted by like reference letters, the abscissa link 16 comprises first and second two-input AND gates 31 and 32 for the first and the second pulse sequences A and B, respectively. A three-output comparator 33 is substituted for the comparator 28 (FIG. 1). In the manner known in the art, the comparator 33 produces a pulse sequence as a first result signal which has the first or low and the second or high levels when the pulse count Qf of the second digital signal F is not and is less than the coordinate count Qx of the first digital signal (the abscissa signal) X, respectively. The first result signal is therefore not different from the above-described result signal and will again be denoted by the reference letter G. A second result signal M is given the low and the high levels when the pulse count Qf is not equal to and is equal to the coordinate count Qx, respectively. In other words, the second result signal M has the low level when the pulse count Qf is either greater or less than the coordinate count Qx. A third result signal N is not used.

The first result signal G is used as before. The second result signal M is supplied to the first and the second AND gates 31 and 32 with inversion so as to make the gates 31 and 32 operate as first and second inhibit gates for the first and the second pulse sequences A and B, respectively. In any event, the link 16 is operable in the manner described with reference to FIG. 2 except that production of the first and the second pulse signals X1 and X2 is suspended when the pulse count Qf becomes equal to the coordinate count Qx in the manner exemplified in time intervals between the second and the third time instants t2 and t3 and after the fourth time instant t4. It is therefore possible with the modification to obviate alternate representation of pulse counts Qx and (Qx−1) by the second digital signal F when the pulse count Qf converges to the coordinate count Qx.

Reviewing FIGS. 1 through 3, the link 16 of FIG. 1 comprises output connections for producing the first and the second pulse sequences A and B as the first and the second pulse signals X1 and X2, respectively. In FIG. 3, the AND or inhibit gates 31 and 32 collectively serve as an output device which in controlled by the second result signal M for producing the first and the second pulse sequences A and B as the first and the second pulse signals X1 and X2 when the second result signal M has the first or low level and for suspending production of the first and the second pulse signals X1 and X2 when the pulse count Qf becomes equal to the coordinate count Qx to make the second result signal M have the second or high level. It is convenient depending on the circumstances to refer to a combination of the pulse sequence generator 18 and either the output connections or the output device 31–32 as a pulse signal generator. Inasmuch as the second result signal M is supplied to the pulse signal generator like the first result signal G, it is possible to understand that the second result signal M is supplied to the output device 31–32 of the pulse signal generator through the above-mentioned supplying connection.

Before further describing man-machine links according to this invention with reference to FIGS. 4 and 5, the interface for a mouse will be described to a little more detailed extent. The afore-described interface counter is initialized on using the mouse so as to produce the interface digital signal representative of an initial value which corresponds to an origin preselected on the coordinate system. Typically, the origin is selected at a leftmost and top corner of a coordinate plane so that the coordinate plane corresponds to the fourth quadrant of the coordinate system. At this instant, a "cursor" represents the origin on a display as a position of the mouse. When the mouse is moved to another position, the cursor represents the other position. The interface is normally designed so that the interface counter is no more responsive to the mouse two-phase signal when the mouse is moved beyond the coordinate plane. The man-machine link illustrated with reference to FIGS. 1 through 3 is well operative unless the cursor moves beyond the coordinate plane. If the pen-tablet device 11 were put into operation beyond the coordinate plane, a difference or error undesiredly occurs between the second digital signal F and the interface digital signal.

A man-machine link which will be illustrated with reference to FIG. 4 or 5 in the following, is capable of indicating the origin at any time during operation of the pen-tablet device 11. More particularly, the pulse count Qf of the second digital signal F represents a zero when the origin is indicated to the pen-tablet device 11. In response to indication of the origin, the interface digital signal is made to also represent the origin with the interface counter again initialized so that both the second digital signal F and the interface digital signal indicate the zero. The difference is thereby alleviated.

Figure 4:
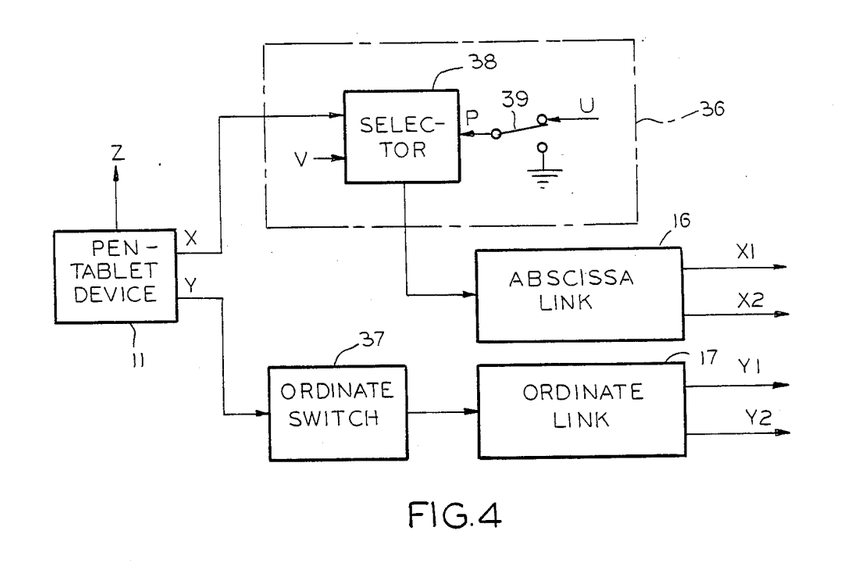
FIG. 4 shows, in combination with tablet device, a block diagram of a man-machine link according to a third embodiment of this invention.

Referring now to FIG. 4, the abscissa and the ordinate signals X and Y are delivered to the abscissa and the ordinate links 16 and 17 through abscissa and ordinate switching circuits 36 and 37, respectively, in a man-machine link according to a second embodiment of this invention, The switching circuits 36 and 37 are operable either individually or collectively as an origin indicating device for use in indicating a position of the origin of the coordinate system in the manner which will be described in the following.

The abscissa switching circuit 36 comprises a selector 38 responsive to a selector control signal P for normally selecting the abscissa signal X for delivery to the abscissa link 16. The selector control signal P is produced by a switch 39 which ordinarily selects a high level signal U. The ordinate switching circuit 37 either shares the switch 39 or comprises a similar switch which is ganged to the illustrated switch 39. The links 16 and 17 are therefore usually supplied as before with the first digital signal which consists of the abscissa and the ordinate signals X and Y.

Only when the switch 39 is manually put into operation or pushed to select a low level signal represented by ground, the selector 38 selects an origin indicating abscissa signal V. An origin indicating ordinate signal is likewise selected in the ordinate switching circuit 37. The origin indicating abscissa and ordinate signals are delivered to the abscissa and the ordinate links 16 and 17, respectively, as the first digital signal or the abscissa and the ordinate signals X and Y indicative of a count (0, 0) as a new origin. The first and the second abscissa and ordinate pulse signals X1, X2, Y1, and Y2 are made to have a common phase difference which corresponds to (0, 0). When the pen 13 (FIG. 1) is moved along the tablet 12 away from the new origin to a point other than the new origin, the pulse signals X1, X2, Y1, and Y2 are given phase differences corresponding to absolute values of coordinates which the point in question has relative to the new origin.

The origin indicating abscissa and ordinate signals may collectively be called an origin indicating signal. The origin indicating signal indicates zero as the coordinate count. The abscissa and the ordinate switching circuits 36 and 37 serve as an origin indicating arrangement for indicating an origin of a two-dimensional coordinate system to produce the origin indicating signal.

It will be understood in connection with the abscissa link 16 that the origin indicating signal V is delivered to the comparator 28 through a delivering connection which connects the origin indicating arrangement 36 to the comparator 28. Supplied with the origin indicating signal V, the comparator 28 uses the zero as the coordinate count Qx. The result signal G is fed back to the pulse sequence generator 18 so as to make the pulse count Qf of the second digital signal F converge to zero. Each of the abscissa and the ordinate links 16 and 17 may have a structure illustrated in conjunction with FIG. 3.

In a modification of the man-machine link illustrated with reference to FIG. 4, the additional signal Z is used in automatically putting the switch 39 into operation. More specifically, the selector control signal P is given the low and the high levels when the additional signal Z indicates that the pen 13 is out of and in touch with the tablet 12, respectively. The switch 39 may be rendered integral with the pen 13. Alternatively, the additional signal Z is used in directly making the selector 38 select the origin indicating signal V and other abscissa signal X when the pen 13 is out of and in touch with the tablet 12, respectively. Incidentally, it is readily possible in the manner described in the above-referenced Teixeira et al report to make the additional signal Z indicate that the pen 13 is out of touch with the tablet 12 when the pen 13 is moved a predetermined distance away from the tablet 12.

Figure 5:
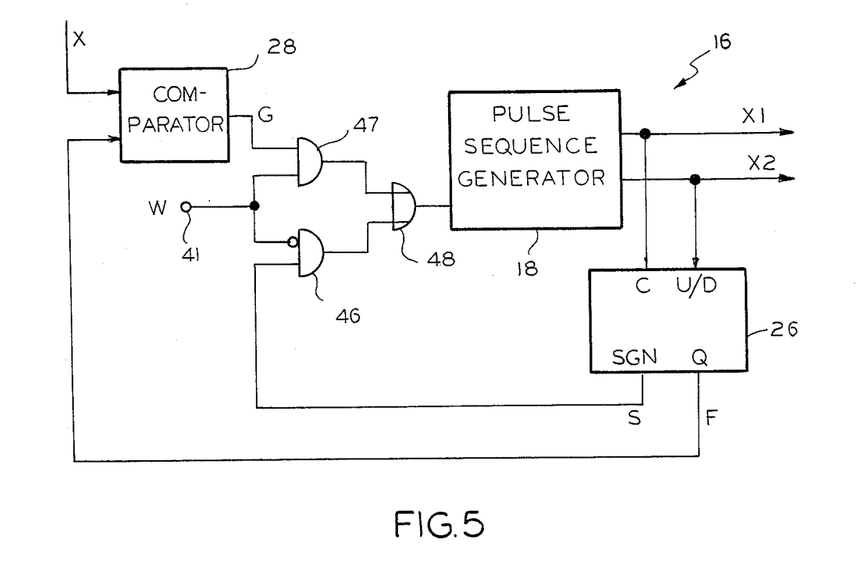
FIG. 5 is a partial block diagram of a man-machine link according to a third embodiment of this invention.

Turning to FIG. 5, the first and the second abscissa and ordinate pulse signals X1, X2, Y1, and Y2 are made to indicate an origin of a new two-dimensional coordinate system without the switching circuits 36 and 37 (FIG. 4) in a man-machine link according to a third embodiment of this invention. The abscissa link 16 comprises an origin input terminal 41 to which an origin signal W is delivered, as from a switch of the type described in conjunction with FIG. 4. The origin signal W is selectively made to indicate the origin and not, by the first or low and second or high levels, respectively. In this event, the switch alone serves as the origin indicating arrangement.

In FIG. 5, the up-down counter 26 has a sign output terminal SGN for producing a sign pulse signal S which has the first or low and the second or high levels when the second digital signal F represents the pulse count Qf of a positive value or zero and a negative value, respectively. Supplied with the origin signal W through a delivering connection as an inhibit signal, an inhibit gate 46 controls the sign pulse signal S to produce an inhibit output signal. The origin signal W enables and disables an AND gate 4P for the result signal G to produce an AND output signal. The inhibit and the AND output signals are supplied to the latch circuit 29 (FIG. 1) through an OR gate 48.

It will be assumed at first that the origin signal W has the second or high level. The result signal G is delivered to the latch circuit 29 through the OR gate 48. The sign pulse signal S is never delivered to the latch circuit 29 because the inhibit gate 46 is inhibited. Operation of the abscissa link 16 is therefore not different from that illustrated with reference to FIGS. 1 and 2.

When the origin signal W is given the first or low level, the result signal G is not delivered to the latch circuit 29. Instead, the sign pulse signal S is supplied to the latch circuit 29 through the inhibit and the OR gates 46 and 48. Unless the pulse count Qf is negative, the sign pulse signal S of the low level is latched and produced as the inverted signal H (FIGS. 1 and 2) of the second or high level. The second pulse sequence B makes the counter 26 count down the pulse of the first pulse sequence A in the manner described for the third time instant t3 (FIG. 2). When the pulse count Qf decreases from zero to minus one, the sign pulse signal S build up to the high level. The latch circuit 29 produces the inverted signal H with the low level. The counter 26 counts up in the manner described for the second or the fourth time instant t2 or t4. So long as the origin signal W is given the low level, the pulse count Qf is either zero or minus one. It is therefore possible to make the pulse count Qf of the second digital signal F converge to zero.

The gates 46 through 48 serve as a selecting arrangement. The origin signal W is delivered to the selecting arrangement as a selection signal through a delivering connection which connects the origin input terminal 41 to the inhibit and the AND gates 46 and 47. The above-described supplying connection supplies the result signal G to the selecting arrangement as a supply signal. Responsive to the selection signal, the selecting arrangement selects the sign pulse signal and the result signal G as the afore-mentioned input signal when the origin signal W has the first and the second levels, respectively. A combination of the pulse sequence generator 18 and the selecting arrangement may again be called a pulse signal generator. Each of the links 16 and 17 may comprise the output device described in connection with FIG. 3.

While this invention has thus far been described in conjunction with a few embodiments thereof and several preferred modifications, it will now readily be possible for one skilled in the art to put this invention into practice in various other manners. Above all, the abscissa and the ordinate links 16 and 17 may not comprise the digital circuit elements described above but may be an electronic digital computer which is controlled in any one of the manners so far described. This applies to the abscissa and the ordinate switching circuits 36 and 37. Incidentally, it is possible to select the predetermined repetition period between 2 and 20 kHz.

What is claimed is:

1. A man-machine link for use in combination with a tablet device which produces a first digital signal that is representative of a coordinate count of a point on a two-dimensional coordinate system, said link comprising:
    pulse signal generating means for generating a first and a second pulse signal, pulses of said first pulse signal having a predetermined repetition period, said second pulse signal having a variable phase difference relative to said first pulse signal, each pulse of said second pulse signal alternately having a first and a second level;
    counting means responsive to said second pulse signal for counting the pulses of said first pulse signal to produce a second digital signal which is representative of a pulse count which increases and decreases when each pulse of said second pulse signal has said first and said second levels, respectively;
    comparing means responsive to said first digital signal pulse signals for comparing said pulse count with said coordinate count to produce a result signal indicative of whether said pulse count is not or is less than said coordinate count; and
    supplying means for supplying said result signal to said pulse signal generating means to make said pulse signal generating means generate said first and said second pulse signals with said variable phase difference adjusted so as to make said pulse count converge to said coordinate count.

2. A man-machine link as claimed in claim 1, wherein said pulse signal generating means comprises:
    pulse sequence generating means for generating a first and a local pulse sequence at said predetermined repetition period and with a predetermined phase difference, each pulse of said local pulse sequence alternately having said first and said second levels;
    latching means responsive to said local pulse sequence for latching and input signal as a latched signal and for producing said latched signal with inversion as an inverted signal;
    exclusive OR gating means responsive to said local pulse sequence and said inverted signal for producing a second pulse sequence; and
    output means for producing said first and said second pulse sequences as said first and said second pulse signals, respectively;
    said comparing means producing said result signal with said first and said second levels indicating whether said pulse count is more or is less than said coordinate count, respectively;
    said supplying means supplying said result signal to said latching means as said input signal.

3. A man-machine link as claimed in claim 1, wherein:
    said pulse signal generating means comprises:
    pulse sequence generating means for generating a first and a local pulse sequence at said predetermined repetition period and with a predetermined phase difference, each pulse of said local pulse sequence alternately having said first and said second levels;
    latching means responsive to said local pulse sequence for latching an input signal as a latched signal and for producing said latched signal with inversion as an inverted signal;
    exclusive OR gating means responsive to said local pulse sequence and said inverted signal for producing a second pulse sequence; and
    output means responsive to a control signal and said first and said second pulse sequences for controllably producing said first and said second pulse signals;
    said comparing means producing said result signal separately as a first and a second result signal, with said first result signal giving said first or said second levels when said pulse count is more than or is less than said coordinate count, respectively, and with said second result signal giving said first or said second levels when said pulse count is not equal to or is equal to said coordinate count, respectively;
    said supplying means supplying said first result signal to said latching means as said input signal and supplying said second result signal to said output means as said control signal to make said output means produce said first and said second pulse sequences as said first and said second pulse signals, respectively, when said second result signal has said first level, and to make said output means suspend production of said first and said second pulse signals when said second result signal has said second level.

4. A man-machine link as claimed in claim 1, further comprising:
    origin indicating means for indicating an origin of a two-dimensional coordinate system to produce an origin indicating signal indicative of zero as said coordinate count; and
    delivering means for delivering said origin indicating signal to said comparing means to make said comparing means use the coordinate count of zero;
    said supplying means thereby making said pulse signal generating means generate said first and said second pulse signals with said variable phase difference adjusted so as to make said pulse count converge to zero.

5. A man-machine link as claimed in claim 4, wherein:

said pulse signal generating means comprises:

pulse sequence generating means for generating a first and a local pulse sequence at said predetermined repetition period and with a predetermined phase difference, each pulse of said local pulse sequence alternately having said first and said second levels;

latching means responsive to said local pulse sequence for latching an input signal as a latched signal and for producing said latched signal with inversion as an inverted signal;

exclusive OR gating means responsive to said local pulse sequence and said inverted signal for producing a second pulse sequence; and output means for producing said first and said second pulse sequences as said first and said second pulse signals, respectively;

said comparing means producing said result signal with said first and said second levels when said pulse count is not and is less than said coordinate count, respectively;

said supplying means supplying said result signal to said latching means as said input signal.

6. A man-machine link as claimed in claim 4, wherein:

said pulse signal generating means comprises:

pulse sequence generating means for generating a first and a local pulse sequence at said predetermined repetition period and with a predetermined phase difference, each pulse of said local pulse sequence alternately having said first and said second levels;

latching means responsive to said local pulse sequence for latching an input signal as a latched signal and for producing said latched signal with inversion as an inverted signal;

exclusive OR gating means responsive to said local pulse sequence and said inverted signal for producing a second pulse sequence; and output means responsive to a control signal and said first and said second pulse sequences for controllably producing said first and said second pulse signals;

said comparing means producing said result signal separately as a first and a second result signal, with said first result signal given said first and said second levels when said pulse count is not and is less than said coordinate count, respectively, and with said second result signal given said first and said second levels when said pulse count is not and is equal to said coordinate count, respectively;

said supplying means supplying said first result signal to said latching means as said input signal and supplying said second result signal to said output means as said control signal to make said output means produce said first and said second pulse sequences as said first and said second pulse signals, respectively, when said second result signal has said first level, and to make said output means suspend production of said first and said second pulse signals when said second result signal has said second level.

7. A man-machine link as claimed in claim 1, further comprising:

origin indicating means for indicating an origin of a two-dimensional coordinate system to produce an origin signal which selectively indicates or does not indicate said origin; and delivering means for delivering said origin signal to said pulse signal generating means to make said pulse signal generating means generate said first and said second pulse signals with said variable phase difference adjusted so as to make said pulse count converge to said coordinate count and to zero depending upon whether said origin signal indicates or does not indicate said origin, respectively.

8. A man-machine link as claimed in claim 7, said origin signal having said first and said second levels when made to indicate and not to indicate said origin, respectively, wherein:

said pulse signal generating means comprises:

pulse sequence generating means for generating a first and a local pulse sequence at said predetermined repetition period and with a predetermined phase difference, each pulse of said local pulse sequence alternately having said first and said second levels;

latching means responsive to said local pulse sequence for latching an input signal as a latched signal and for producing said latched signal with inversion as an inverted signal;

exclusive OR gating means responsive to said local pulse sequence and said inverted signal for producing a second pulse sequence; and output means for producing said first and said second pulse sequences as said first and said second pulse signals, respectively;

said counting means being for further producing a sign pulse signal given said first and said second levels when said pulse count is not and is negative, respectively;

said pulse signal generating means further comprising selecting means responsive to a selection signal having said first and said second levels for selecting said sign pulse signal and a supply signal as said input signal when said selection signal has said first and said second levels, respectively;

said comparing means producing said result signal with said first and said second levels when said pulse count is not and is less than said coordinate count, respectively;

said supplying means supplying said result signal to said selecting means as said supply signal;

said delivering means delivering said origin signal to said selecting means as said selection signal.

9. A man-machine link as claimed in claim 7, said origin signal having said first and said second levels when made to indicate and not to indicate said origin, respectively, wherein:

said pulse signal generating means comprises:

pulse sequence generating means for generating a first and a local pulse sequence at said predetermined repetition period and with a predetermined phase difference, each pulse of said local pulse sequence alternately having said first and said second levels;

latching means responsive to said local pulse sequence for latching an input signal as a latched signal and for producing said latched signal with inversion as an inverted signal;

exclusive OR gating means responsive to said local pulse sequence and said inverted signal for producing a second pulse sequence; and output means responsive to a control signal and said first and said second pulse sequences for controllably producing said first and said second pulse signals;

said counting means further producing a sign pulse signal given said first and said second levels when said pulse count is not and is negative, respectively;

said pulse signal generating means further comprising selecting means responsive to a selection signal having said first and said second levels for selecting said sign pulse signal and a supply signal as said input signal when said selection signal has said first and said second levels, respectively;

said comparing means producing said result signal separately as a first and a second result signal, with said first result signal given said first and said second levels when said pulse count is not and is less than said coordinate count, respectively, and with said second result signal given said first and said second levels when said pulse count is not and is equal to said coordinate count, respectively;

said supplying means supplying said first result signal to said selecting means as said supply signal and for supplying said second result signal to said output means as said control signal to make said output means produce said first and said second pulse sequences as said first and said second pulse signals, respectively, when said second result signal has said first level, and to make said output means suspend production of said first and said second pulse signals when said second result signal has said second level;

said delivering means delivering said origin signal to said selecting means as said selection signal.

* * * * *